Apr. 24, 1923.
W. E. WILLIAMS
STEEL WHEEL FOR AUTOMOBILES
Filed Sept. 8, 1919
1,452,772
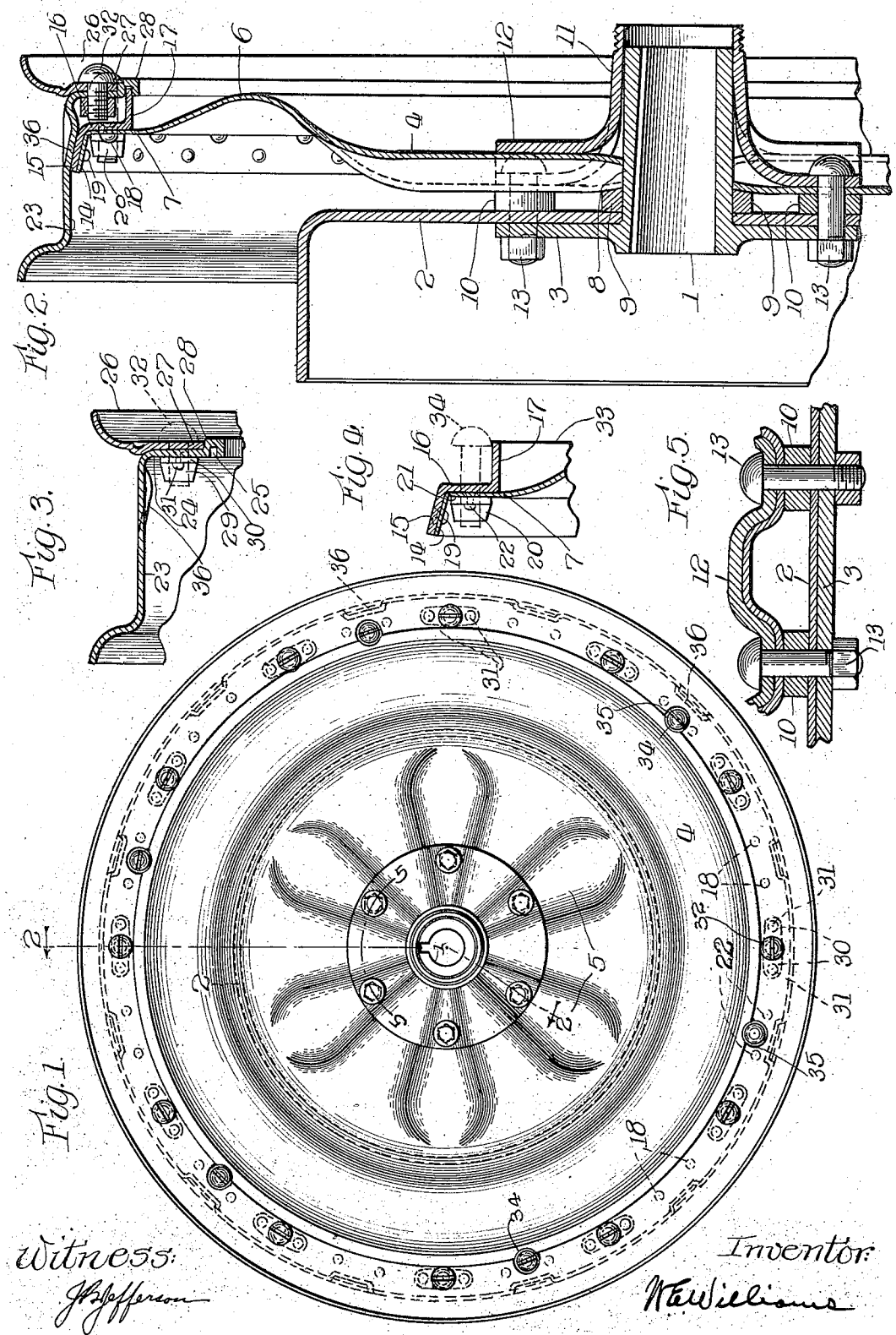

Patented Apr. 24, 1923.

1,452,772

UNITED STATES PATENT OFFICE.

WILLIAM ERASTUS WILLIAMS, OF CHICAGO, ILLINOIS.

STEEL WHEEL FOR AUTOMOBILES.

Application filed September 8, 1919. Serial No. 322,388.

*To all whom it may concern:*

Be it known that I, WILLIAM ERASTUS WILLIAMS, a citizen of the United States, resident of Chicago, county of Cook, and State of Illinois, have invented a new and useful Improvement in Steel Wheels for Automobiles, of which the following is a specification.

The object of this invention is to provide a steel disk wheel for automobiles in which lightness, strength, and simplicity are highly important, and, in a wheel of this kind, to utilize both tension and compression, as well as to provide a novel demounting feature.

Reference will be had to the accompanying drawing in which Figure 1 is a front elevation of the wheel. Figure 2 is a vertical sectional elevation on line 2—2 of Figure 1. Figure 3 is a section of the rim when the same is detached. Figure 4 is a section of the fixed rim of the wheel. Figure 5 is a section on line 5—5 of Figure 1.

In the drawing 1 indicates the ordinary hub, here shown as the rear hub of an automobile. 2 indicates the brake drum and 3 the main flange of the hub.

4 indicates the disc of my wheel which is thicker around the hub and is thinner at the margin. This disk 4 is provided with a series of radial corrugations 5 extending outwards from the hub and then disappearing and merging into a smooth surfaced bulge or swell 6. From this swell 6 the plate of the disc bends inward into the vertical flange 7, parallel with the plane of rotation of the wheel.

My corrugations 5 extend down to the hub 1 and fit snugly thereon around the surface 8. A filler ring 9 fills in the space between the inner ends of the corrugations and the brake drum and hub flange of the main hub 1. Washers 10 are used between the bottoms of the corrugations 5 and this brake drum 2 in order to properly space out and locate the main body of the disc at this point, approximately in the pressure line of the load plane of the wheel.

It is understood that the construction here shown, as relates to the hub itself, is intended to adapt my disc wheel to the hubs employed for wooden wheels and some features thus shown may not be necessary with the hubs made in the first instance to suit my disc.

A clamping member 11 embraces the outer end of the hub 1 and is provided with a corrugated flange 12, adapted to clamp the corrugations to my disc, through the assistance of round headed bolts 13, which pass through the flange 12, my disc, the washers 10 and the flange 3 of the hub 1. These corrugations of the flange 12 fade out or merge in to the outer smooth end of the member 11.

The margin of my disc beyond the plane circle or zone 7, is turned over into the flange 14 which butts against the fixed rim 15 here shown as in Z cross section. This rim has a straight body portion 16 and a horizontal flange portion 17. Rivets 18 secure the portion 7 to the vertical portion 16 of this rim, and rivets 19 secure the flange 14 to the inclined flange 15 of the fixed rim. At intervals around the margin of this fixed rim, there are perforated threaded blocks 20, provided with small flanges 21 secured to the disc and portion 16 of the fixed rim by rivets 22.

The demountable rim of the wheel is indicated by 23 and is provided with an inwardly projecting flange 24 which is bent over at its inner margin forming the groove 25.

In connection with the main rim 23 there is a companion flange 26, having the vertical flange 27 which butts against a shoulder 28 of the flange 24 of the main rim. Blocks 29, having threaded perforations, are provided with flanges 30 which are secured by rivets 31 to flange 24 of the main rim. These rivets have countersunk heads and thus do not interfere with the close contact of the flange 27 of the companion flange 26.

The form of rim here shown is adapted to take what is known as a "straight side" tire, but may be made to take any other suitable type. A series of screws 32 screw through the flange 27, the flange 24 and into the blocks 29 and thus fasten the companion flange 26 to the main rim 23. This arrangement of the flange 26 with the main rim affords a quick detachable feature for an inflated tire. The shoulder 28 of the main rim furnishes a register and a support to the companion flange 26 that relieves the screws 32 from receiving and transmitting to the narrow zone between the screws and the edge of the rim dangerous load shocks.

The groove 25, when the demountable rim is in place embraces the edge 33 of the flange 17. Screws 34 the heads of which pass through clearance holes 35, in the flange 27, of the companion flange 26, clamp the flange 24 of the main flange 23 to the fixed rim of the wheel by means of being screwed into the blocks 20 previously described. Thus by loosening the six screws 34 I may take off the rim 23 with its companion flange 27 in-toto and replace a similar one, on which there is mounted a fully inflated tire in the ordinary manner of demounting a rim.

When a new tire is to be placed on the rim, I loosen the screws 32 and remove the flange 26 and thus detach the tire.

The construction shown whereby I connect the rim 23 to the fixed rim 15, through the medium of the groove 25 and edge 23 of the flange 17 of the fixed rim, serves to produce, when the parts are properly fixed together, a wheel in which both tension and compression are taken up by the demountable rim as well as the fixed rim.

The inclined flange 15 of the fixed rim rests against inclined depressions 36 in the main tread on the rim 23, so as always to avoid all looseness of these parts when they are properly clamped together through the medium of the screws 34.

The demounting and quick detachable features as indicated, wherein I use the screws 34 and 35 are desirable constructions, since it is usually easier and quicker to take out and replace these screws than it is to manipulate wedges or rings otherwise used in demountable and quick detachable features.

By means of my plain, smooth disc in this outer body portion, I get a surface which is easily cleaned and which, by means of the swell or bulge 6, gives a degree of elasticity to the wheel and the corrugations around the hub so stiffen this region that I may use a thinner plate for a single disc wheel than might otherwise be best with a plain disc.

What I claim is:—

1. In a wheel of the class described, the combination with a disk having an annular member secured to the marginal portion of its outer face and provided at its own inner margin with an annular laterally projecting flange, of a rim body member encircling said annular member and having at one margin an annular flange extending toward the center of the wheel and provided with a lateral groove engaging the margin of said laterally projecting flange, and means for rigidly connecting said disk, annular member and rim body member.

2. In a wheel of the class described, the combination with a disk, of an annular member fixed to the peripheral portion of the disk and presenting to all radial strains edgewise resistance of a broad plane web, and a main tire-carrying rim body member engaging said annular member and sharing said strains.

3. In a wheel of the class described, the combination with a disk, of an annular member having a plane annular portion resting against the side of the peripheral portion of the disk and provided at its inner margin with an annular flange projecting outwardly from the disk's plane, a main rim member encircling the disk and having at one margin an inturned laterally grooved flange engaging the margin of the outwardly extending flange, and means maintaining the engagement.

4. In a wheel of the class described, the combination with a disk, of an annular member having a plane annular portion alongside one face of the peripheral portion of the disk and provided at its inner margin with an annular flange projecting laterally from the disk and at its other margin with an annular portion bent oppositely, with the corresponding portion of the disk, to form an inclined rim seat, a main rim member resting on said seat and having at one margin an inturned laterally grooved flange engaging the margin of the outwardly extending flange, and means for detachably locking the two flanges together.

5. A demountable rim disk wheel including a demountable rim, a fixed rim, and a disk, said demountable rim having an inward projecting flange and said fixed rim a flange projecting laterally to meet the flange first mentioned, and means for detachably binding the two flanges together.

6. In a wheel of the class described, the combination with a disk, of an annular member having its central zone fitting the side of the peripheral portion of the disk, its outer portion secured to and bent laterally with the corresponding zone of the disk to form an inclined rim seat, and its inner portion bent oppositely to form an annular outwardly projecting flange, and a rim body removably fitting said seat and having an in-turned flange detachably secured to said annular flange.

7. In a wheel of the class described, a rim, and a disk web, the disk web attached to the rim by rivets, securing it to a flange of the rim, and also by a series of blocks located on the outside of the web and riveted through the web to the flange of the rim located on the opposite side of the web.

Signed at Chicago, in the county of Cook and State of Illinois, this sixth day of September, 1919.

WILLIAM ERASTUS WILLIAMS.

Witnesses:
JOHN B. JEFFERSON,
B. J. BERNHARD.